Patented June 16, 1936

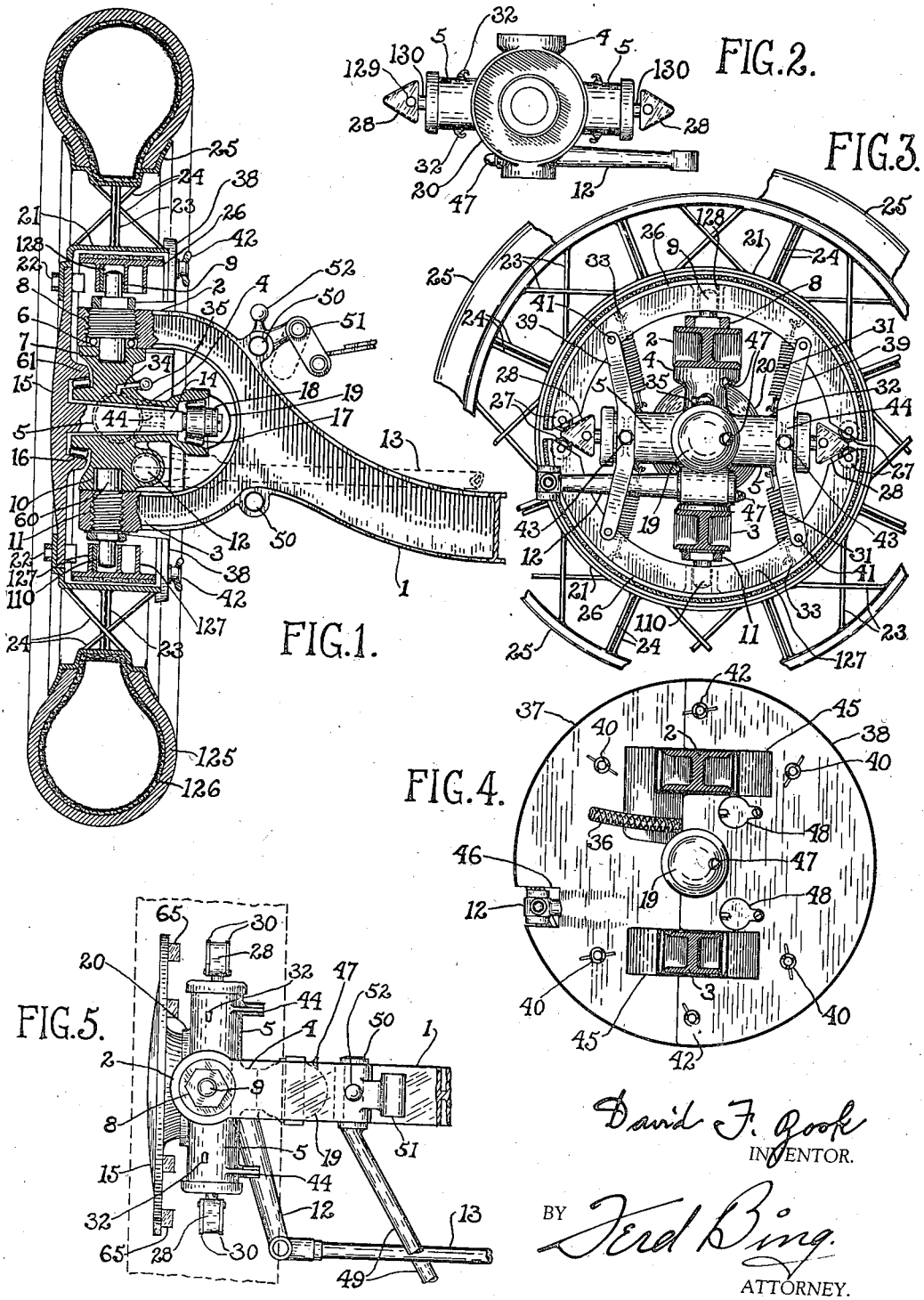

2,044,490

UNITED STATES PATENT OFFICE 2,044,490

MOTOR VEHICLE BRAKE

David F. Zook, Evanston, Ill.

Application September 26, 1934, Serial No. 745,567

11 Claims. (Cl. 188—194)

My invention pertains generally to motor-vehicles, and particularly to improvements in the front-wheel mounting of such vehicles.

Several of the principal objects of this invention are to improve the steering characteristics of such vehicles, to reduce road shocks upon the steering mechanism, and prevent wheel-wabble.

Another prime object is to provide a front wheel mounting wherein both the camber and gather may be reduced to the minimum so as to reduce tread-wear of the front tires.

A further object is to provide a front wheel mounting wherein all of the parts are located within the outer side of the wheel in such a manner as to be protected from rut or curb damage.

A further object is to provide such a structure in which the steering mechanism and rods are protected from damage.

Another object is to provide a front wheel assembly having a brake-drum of large diameter and width, with brake-shoes which substantially fill the entire inner periphery of the drum so as to improve the efficiency of the braking mechanism.

A still further object is to provide a wheel wherein the inner annulus of the wheel functions as a brake-drum, the wheel being of the steel-spoke type whereby the spokes act as fins to aid in dissipating the heat from brake mechanism.

Another object is to provide new and improved brake mechanism wherein no shoe-adjustment is required.

Still another object is to provide a front wheel mounting in which the brakes are readily accessible for inspection or shoe-replacements, and wherein the entire brake structure is housed well within the side lines of the tires, so as to be protected on rutty, rough or stony roads.

Other objects and advantages will become apparent from the following description, taken in connection with the accompanying drawing in which:

Fig. 1 is a rear view of an axle end, with the jaws partly sectional, showing a wheel and mounting means in vertical section.

Fig. 2 is a side elevational view of the hub unit, with steering arm attached, as viewed from the outer side of the wheel.

Fig. 3 is a side view of wheel, brake and mounting assembly, from an inside point of observation, showing the axle-jaws in section, and housing or cover plates removed.

Fig. 4 is a view from the same point as in Fig. 3, and shows the axle-jaws in section and the brake mechanism enclosed by cover plates.

Fig. 5 is a plan view of an axle end showing the hub unit and wheel spindle mounted thereon, the steering connections, radius rod attachment, and (in outline) the relation of the tire sides thereto.

While my invention is susceptible of embodiment in many different forms, I have shown in the drawing and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

In the form chosen for disclosure herein the invention is embodied in a rigid front axle construction as distinguished from a mounting, wherein independent springing is employed for the two front wheels, the illustrated embodiment having an axle 1 formed with a semi-circular yoke at each end terminating in spaced upper and lower jaws 2 and 3 between which a steering knuckle 4 is journaled. To support the axle 1 on the steering knuckle 4 an upper bearing 6 is provided in the upper jaw 2, this bearing preferably being of the anti-friction thrust-bearing type retained and adjusted by a member 8 threaded into the top of the upper jaw 2. At the lower end of member 9 a stud or trunnion bearing 7 projects into a corresponding radial-bearing socket formed in the knuckle 4 to insure proper centering or radial positioning of the knuckle 4 with respect to the jaw 2.

At the lower end of the steering knuckle 4 a bearing 10 is provided which is also of anti-friction type, needle rollers being employed as shown here, and the bearing 10 being carried and secured in place by threaded member 11 screwed into a corresponding threaded hole in lower jaw 3. The upper end of member 11 is formed to provide a trunnion 60 about which the rollers of bearing 10 may turn, the bearing 10 being mounted within a corresponding socket at the bottom of knuckle 4, as shown. Adjacent to the lower end of the knuckle 4, a steering arm 12 is secured with its tie rod 13 joining both front wheels for steering, as is standard practice.

In accordance with the present invention the steering knuckle 4 is formed and constructed in such a manner as to house and journal a wheel spindle 14 which extends through the knuckle 4 transversely of the pivotal axis 6—10 and carries on its outer end an integral wheel-disk 15. A wheel 21 is bolted to the rim of this disk 15, the numeral 21 referring particularly to the inner or brake-drum portion of a complete wheel, which in its entirety consists of a welded unit of drum 21, spokes 23 and 24, and tire-rim 25. This wheel is so mounted that the central plane thereof, coincides with the steering axis 6—10. As a result, shock and strain upon the steering mechanism, caused by forward impact of the tire 125 against road obstructions is minimized. Moreover, the compactness of the spindle structure results in its complete enclosure within the outermost plane of the tire 125 thereby protecting the spindle assembly at all times.

To provide a mounting for the spindle 14, the knuckle 4 is laterally taper-drilled to accommodate, with slight clearance, the wheel spindle 14 which is preferably mounted to revolve upon anti-friction bearings. An outer load carrying bearing 16, has its rollers running between an outer bearing flange 61 upon the disc member 15, and an opposed annular surface turned on the side of the knuckle 4. The inner end of spindle 14 rotates upon a bearing 17, also shown as of roller design, positioned within the inner end of the spindle receiving bore and adjustably retained at the proper setting by the usual nuts and lock-washers 18. The inner end of the spindle receiving bore is closed by a tight cap 19, to retain lubricant and exclude dirt and water. On the outer face of the hub is an annular grease-baffle ring 20, which surrounds the flange 61 with very little clearance, and serves to retain grease at the bearing 16, and to exclude dirt, water, etc.

The wheel 21 as herein illustrated is of the steel spoke type wherein an inner annulus 21 functions as a brake drum and is joined to an outer drop center rim 25 by two sets of steel spokes 23 and 24, one set 23 being parallel to the central plane of the rim 25 and the other set 24 being angularly disposed. A tire casing 125 with inner tube 126 are shown mounted upon this rim. All spokes are practically the same in length, the system of support for the wheel being symmetrical, and the angles of the spokes provide great strength from any and all directions. The spokes 23 and 24 being secured, by welded joints or the like, to the drum 21 serve as heat dissipators for the brake drum 21 and thereby insure better operation and longer life in the brake mechanism.

In the form illustrated the wheel 21 is removably secured on the disk 15 by bolts 22 which extend through an inturned flange on the brake drum 21 and are threaded into the edge of the disk 15 and into reinforcing lugs 65 on the inner side thereof. With the inner annulus of the demountable wheel 21 serving as a brake drum many advantages are attained. For example it will be noted that by the mere dismounting of the wheel 21 the outside brake enclosure is removed, and the brake mechanism is exposed for inspection, cleaning or repair. With the form of brake mechanism herein disclosed, this result is of particular advantage as will hereinafter appear, due to the simplicity and accessibility of the particular brake mechanism.

Within the brake-drum-wheel are mounted two wide brake-shoes 26, which are stiffened and strengthened by a double web 127. These shoes 26 are of substantially equal length and are individually anchored preferably by direct connection with the axle as distinguished from the conventional anchor plate construction. To this end the web of each shoe has a socket 128 provided centrally of the shoe to receive studs 9 and 110 projecting axially from the member 8 and the member 11 respectively. Each end of both shoes 26 bear rollers 27, which rest upon wide angle wedges 28 between edge flanges 30 which retain and guide the rollers 27 and cause the brake-shoes to turn upon their pivots 9 and 110, as the wheel is turned in steering. The wedges 28 constitute a portion of the brake actuating means which is preferably hydraulic in character.

Such hydraulic brake actuating mechanism is preferably carried by the steering knuckle 4 and comprises two alined cylinders 5 integrally formed on the knuckle 4 on opposite sides of the spindle-receiving bore. From conventional pistons (not shown) in the cylinders 5, piston rods 130 extend for operative connection with the wedges 128. Such a connection preferably includes transverse pivots 129 to assure equalized pressure on both adjoining rollers 27.

To retract the brake-shoes and maintain them in position four coil springs 31 are used, two to each shoe. Each spring is simply snapped over two hooks, 32 being hooks on the brake cylinders, and 33 are hooks on the under side of the brake-shoes.

At their inner ends the brake cylinders 5—5 are connected by a common passage 34 drilled in the hub 4, to a hose-fitting 35, to which a usual hydraulic-brake hose 36 is attached.

On the inner side of the wheel the brake mechanism is enclosed by cover-plates 37 and 38, the plate 37 being behind the axle, and the plate 38 forward of the axle. In assembly, the rear plate is first mounted, after which the front plate is mounted in an overlapping relation thereto. Two flexible brackets 39 support the cover-plates, which are of light material, four wing-nuts 40 holding the covers to the bracket-ends 41. Two additional wing-nuts 42 lock the overlapping upper and lower edges of the two cover-plates together, to prevent rattle. The brackets 39 are held by bolts 43 to bosses 44, which are cast as integral parts of the brake-cylinders 5—5. These brackets are flexible and the covers light-weight to preclude damage to the brake-cylinders.

The cover-plates 37 and 38 are recessed or slotted at 45 to accommodate the axle yoke and brake-hose. Also at 46 the rear plate is cut out and off-set to accommodate the end of steering arm 12. Lubricator fittings 47 are provided for the various bearings, one such fitting being applied to the inner spindle cap 19 and two to the knuckle 4 for greasing the steering-pivot bearings. These latter two fittings are accessible through small covered openings in the front plate, shown at 48.

As herein illustrated the axle 1 is stoutly braced by a double-radius rod 49, which has twin mountings 50, on the axle, and the tie-rod 13 passes between these two supports (see Figs. 1 and 5). A spring hanger 51, for a transverse type of spring is illustrated, and a shock absorber link ball incorporated as at 52, but those particular features might be radically different without altering in any way the wheel design as here depicted and described.

With the steering axis 6—10 lying in the central plane of the wheel and tire it is possible to reduce or eliminate the camber usually introduced in the wheel mounting, and since the camber is inter-related with the caster-effect and toe-in factors, the determination of these factors is materially simplified. In addition, it renders possible the substantial centering of the brake shoes with respect to the central plane of the tire tread, with an unusually simple and effective mounting and anchoring arrangement for the brakes.

Greater efficiency is also obtained through the novel relationship of the brake actuators to the other elements of wheel mounting, for it will be evident that the axis of the pistons is in the central plane of the brake shoes, and is relatively close to the central plane of the tire tread. Thus eccentricity of the various forces acting in the assembly is reduced to an inconsequential amount. The brake actuators, being equipped with relatively large wedges 28, are capable of applying the brakes efficiently and without adjustment until the brake linings are entirely worn away.

From the foregoing it will be apparent that this construction provides an axle whose yoke end extends into the median portion of the wheel, and that the steering pivots are on an axis which, if extended vertically, above and below, would intersect the tire-tread at its exact center. This is the ideal center about which to turn the wheel in steering, it provides the easiest steering possible, practically abolishes chances of wheel wobble, eliminates many of the road shocks from the steering gear, and has much to do with the service obtained from front tires. Camber and gather or toe-in both cause a non-true setting of a wheel and to reduce these angles or eliminate them serves to reduce tread wear greatly. The wheel spindle in this construction swings in a protected position within the jaws of the axle-yoke and its outermost part, namely, the disc 15, together with all wheel parts are well within the outer side-line of the tire, and no part projects to be damaged by ruts or chafing against curbs.

The steering arm 12 and cross-steering rod 13 it is observed, are well above and to the rear of the axle's lowest point, also the cross-rod 13 is further protected above and below by the double radius rod 49.

From the drawing it will be seen that the brake-drum, or wheel is of large diameter, and has wide face. This gives an over-size brake surface, and the two brake shoes almost completely fill the entire periphery of the drum. The great area of the brake-shoes produces the required braking effect with greater efficiency with the result that longer life is obtained for brake-linings.

These brakes have no shoe-adjustment. The hydraulic system of application equalizes them, and the two large, wide-angled wedges 28 are intended to operate the brakes as long as the brake-linings endure. It will be seen that both ends of both shoes are acted upon by the wedges, and the brake-torque is taken by the members 9 and 110, which also are the centering pivots about which the brakes can turn as the wheel is steered. It will thus be apparent that the axle yoke takes the brake-torque, and none of this strain falls upon the hub, which merely carries the load. Also, it is observed how strongly the axle yoke is braced and supported in its work by the stout radius arm.

With the object of reducing weight and cooling the brakes, it will be evident that the wheel 21 also fulfills the duty of a brake-drum. As stated previously this wheel, with the welded, steel spokes, and tire-carrying rim form one homogeneous unit, and when brakes are applied the heat generated at the drum is partially conducted to the spokes and even to the tire-rim. This open-work steel structure revolving rapidly in the air, is efficient in dissipating heat from the brake areas.

It is also readily apparent that when the wheel 21 is dismounted the brake-shoes are exposed for inspection or cleaning. This accessibility is most desirable. If it is required to replace the shoes the housing covers 37 and 38 are quickly removed, the springs 31 are unhooked at one end, and the shoes then can be lifted off their pivots 9 and 110. Shoes can be changed without the use of any tools except the jack and wheel-wrench, the same tools used in changing a tire. None of the brake structure projects beyond the side lines of the tires, hence is well shielded on rutty or rough roads.

Both of the wheel-bearings are readily lubricated through the single grease fitting in hub-cap 19. The lubricant must first pass the inner bearing 17, traverse the narrow channel in the hub around the spindle 14 to outer bearing 16, and can only escape past the close-fitting grease-baffle ring 20. The steering-pivot bearings are greased through the openings in housing-plate 38, said openings being normally closed by small hinged covers 48.

The brake-housing covers are of light material, carry no weight or strain, and are simply for the purpose of keeping water and dirt away from the brake mechanism. They are not essential, mechanically.

The construction as shown employs a rigid type of front axle and cross-spring. This particular design of axle or spring, it will be understood, is not necessary, and variations from this form may be substituted. However, a radius-rod bracing for the axle would seem to be so desirable that it should be incorporated if possible.

I claim as my invention:

1. In a front wheel assembly, the combination of a mounting member providing bearing means defining a substantially vertical steering axis, a wheel-mounting knuckle journaled on said bearing means, said knuckle having bearing means adapted to receive and rotatably support a wheel-hub structure with its rotative axis substantially at right angles to said steering axis, a wheel structure on said hub structure having a brake drum extending axially on both sides of said steering axis, an expansible brake-shoe structure positioned within said drum, means pivoting said brake shoe structure directly to said first mentioned mounting member on said steering axis and arranged to anchor said brake shoe structure independently of said knuckle against rotative movement with the drum, and means acting between the knuckle and said brake shoe structure to pivot said brake shoe structure with the knuckle and brake drum.

2. A front wheel assembly for motor vehicles and the like comprising, in combination, a mounting element defining a yoke with vertically spaced upper and lower bearings defining a steering axis, a steering knuckle journaled between said bearings and providing a substantially horizontal spindle-bearing means, a spindle journaled in said bearing means with its inner end projecting through said means toward said yoke, means mounted on the outer end of said spindle defining a brake drum encircling and substantially centered in an axial direction upon said steering axis, an expansible brake shoe structure positioned within said brake drum, means carried by said yoke independent of said knuckle and forming upper and lower pivotal bearings for said shoe structure coincident with said steering axis, hydraulic brake-actuating means having a first element rigid with said knuckle and a second element movable substantially at right angles to said spindle, and means operatively connecting said second element with said shoe structure to actuate said shoe structure and to shift the same about its pivotal mounting as the knuckle is turned in steering.

3. In a front wheel assembly, the combination of a bearing member providing a yoke with upper and lower bearings defining a substantially vertical steering axis, a steering knuckle embraced by said yoke and pivoted in said bearings, said knuckle having means forming a wheel bearing with an axis substantially at right angles to said steering axis, a wheel spindle journaled in said wheel bearing, wheel structure attached to one end of said spindle and having an annular brake drum positioned to surround the end portions of the yoke wherein said upper and lower bearings are formed, brake shoes positioned within said drum, brake shoe anchoring means on said yoke engaging said shoes providing for pivotal movement of said brake shoes with the wheel about said steering axis, and brake actuating means on said knuckle operable to turn the brake shoes about said steering axis with the wheel.

4. In a front wheel assembly, the combination of an axle-end providing a yoke with upper and lower bearings, a wheel-mounting knuckle journaled in said bearings upon a substantially vertical steering axis, said knuckle having means adapted to journal a wheel-spindle with its axis substantially intersecting said steering axis, a wheel-spindle mounted in said bearing means and extending on both sides of said steering axis, wheel means including a brake drum supported on one end of said spindle with the central plane of its tire supporting rim coinciding with said steering axis, a pair of alined hydraulic brake-actuating piston and cylinder devices carried by said knuckle on opposite sides of said steering axis and substantially at right angles to said steering axis and said spindle, and brake shoes within said drum controlled by said devices.

5. A front wheel assembly for motor vehicles and the like comprising, in combination, a mounting element having bearing means defining a steering axis, a steering knuckle journaled on said bearing means and providing a substantially horizontal wheel-bearing means, a wheel journaled on said wheel-bearing having a brake drum, a pair of semi-circular brake shoes positioned within said brake drum, anchor means pivoting each of said brake shoes at its midpoint upon said steering axis, a pair of wedges adapted to be moved between adjacent ends of said shoes to shift the same into braking contact with the drum, means for retracting said brake shoes, and means to actuate said wedges in unison to impart substantially equal applying-motion to both ends of both brake shoes.

6. In a front wheel assembly, the combination of an axle-end providing a yoke with upper and lower bearings, a wheel mounting knuckle journaled in said bearings upon a substantially vertical steering axis, said knuckle having means adapted to journal a wheel-spindle with its axis substantially intersecting said steering axis, a wheel-spindle mounted in said bearing means and extending on both sides of said steering axis, a wheel supported on one end of said spindle with the central plane of its tire supporting rim coinciding with said steering axis, hydraulic brake actuating means carried by said knuckle, a brake drum on said wheel, and brake shoes within said drum anchored directly on said yoke and controlled by said actuating means.

7. In a front wheel mounting and brake assembly for motor vehicles, the combination of an axle-end of yoke form with upper and lower jaws, a triple-axis steering-hub unit pivoted between said axle yoke jaws upon a substantially vertical steering axis, said steering-hub having bearing means defining a transverse axis of rotation for a wheel spindle extending horizontally through said hub, a wheel-spindle rotatably mounted within said steering hub upon said transverse axis, a brake-drum, wheel and tire mounted upon the outer end of said wheel-spindle, said steering-axis, extended, intersecting the center of said tire treads, two, opposed hydraulic-brake cylinders forming an integral part of said steering-hub and located on a longitudinal horizontal axis through said steering hub, all three of said axes substantially intersecting at one point, and said point of axes intersection being on a line intersecting the center of said tire treads.

8. In a front wheel mounting and brake assembly for motor vehicles, the combination of an axle-end of yoke form with upper and lower jaws, a triple-axis steering-hub unit pivoted between said axle yoke jaws upon a substantially vertical steering-axis and transversely drilled to provide a bearing for a wheel-spindle, a wheel spindle mounted in said bearing, an integral brake-drum and wheel mounted on the outer end of said wheel-spindle, the surface of said brake drum being disposed substantially equally on both sides, transversely, of said steering-axis, said steering axis, extended, intersecting the center of the brake drum and said wheel, two semi-circular brake shoes mounted within said brake-drum and pivoted upon said steering axis, the surfaces of said brake shoes being disposed substantially equally on both sides, transversely, of the steering axis, hydraulic-brake cylinders forming an integral part of said steering-hub unit, and hydraulic pistons and actuating wedges operable to apply equalized pressure upon both of said brake-shoes, said disposal of the brake-drum and brake-shoe surfaces operating to relieve steering effort of brake drag or interference when the brakes are applied as the front wheels are being turned.

9. In a front wheel mounting and brake assembly for motor vehicles, the combination of an axle-end of yoke form with upper and lower jaws, a triple-axis steering-hub unit pivoted between said axle jaws upon a substantially vertical steering-axis, a wheel-spindle transversely mounted within said steering-hub, an integral brake-drum and wheel mounted on the outer end of said wheel-spindle, two semi-circular brake-shoes mounted within said brake-drum and pivoted at their mid-points upon said steering axis, said steering axis, extended, intersecting the center of said brake drum and wheel, said brake shoe pivots constituting anchors directly upon said axle yoke jaws, two opposed, hydraulic brake cylinders forming an integral part of said steering-hub unit, and hydraulic pistons and actuating wedges to operate said brake shoes, said anchoring of said brake shoes operating to transfer brake torque directly to the axle yoke ends, and said anchoring of said brake shoes operating to relieve the steering-hub unit of all stresses due to brake operation.

10. In a front wheel mounting and brake assembly for motor vehicles, the combination of an axle-end of yoke form with upper and lower jaws, a triple-axis steering-hub unit pivoted between said axle yoke jaws upon a substantially vertical steering axis, a transverse wheel-spindle rotatably mounted within said steering-hub, an integral brake-drum and wheel mounted on the outer end of said wheel-spindle, brake shoes mounted within said brake-drum and pivoted at their mid-points upon said steering-axis, said integral brake-drum and wheel consisting of an inner annulus forming the brake-drum, an outer tire-carrying rim and connecting spokes between said drum and rim portions, all of said parts being welded into an integral whole, said integrally welded brake-drum-wheel constituting an efficient heat-dissipating unit, and said integral brake-drum-wheel providing an air cooled brake drum.

11. In a front wheel mounting and brake assembly for motor vehicles, the combination of an axle-end of yoke form with upper and lower jaws, a triple-axis steering-hub unit pivoted between said axle yoke jaws upon a substantially vertical steering-axis, a wheel-spindle transversely mounted within said steering hub, an integral brake-drum and wheel mounted on the outer end of said wheel-spindle, two semi-circular brake-shoes mounted within said brake-drum and pivotally anchored at their mid-points directly upon said axle yoke jaws, said brake drum portion of said integral brake-drum-wheel being directly mounted upon said wheel-spindle, said direct mounting of the brake-drum-wheel upon the wheel-spindle operating to provide immediate accessibility to said brake shoes upon dismounting of said brake-drum-wheel from said wheel-spindle.

DAVID F. ZOOK.